March 8, 1955 V. D. ROOSA 2,703,422
MANICURING DEVICE OR THE LIKE
Filed Sept. 29, 1950
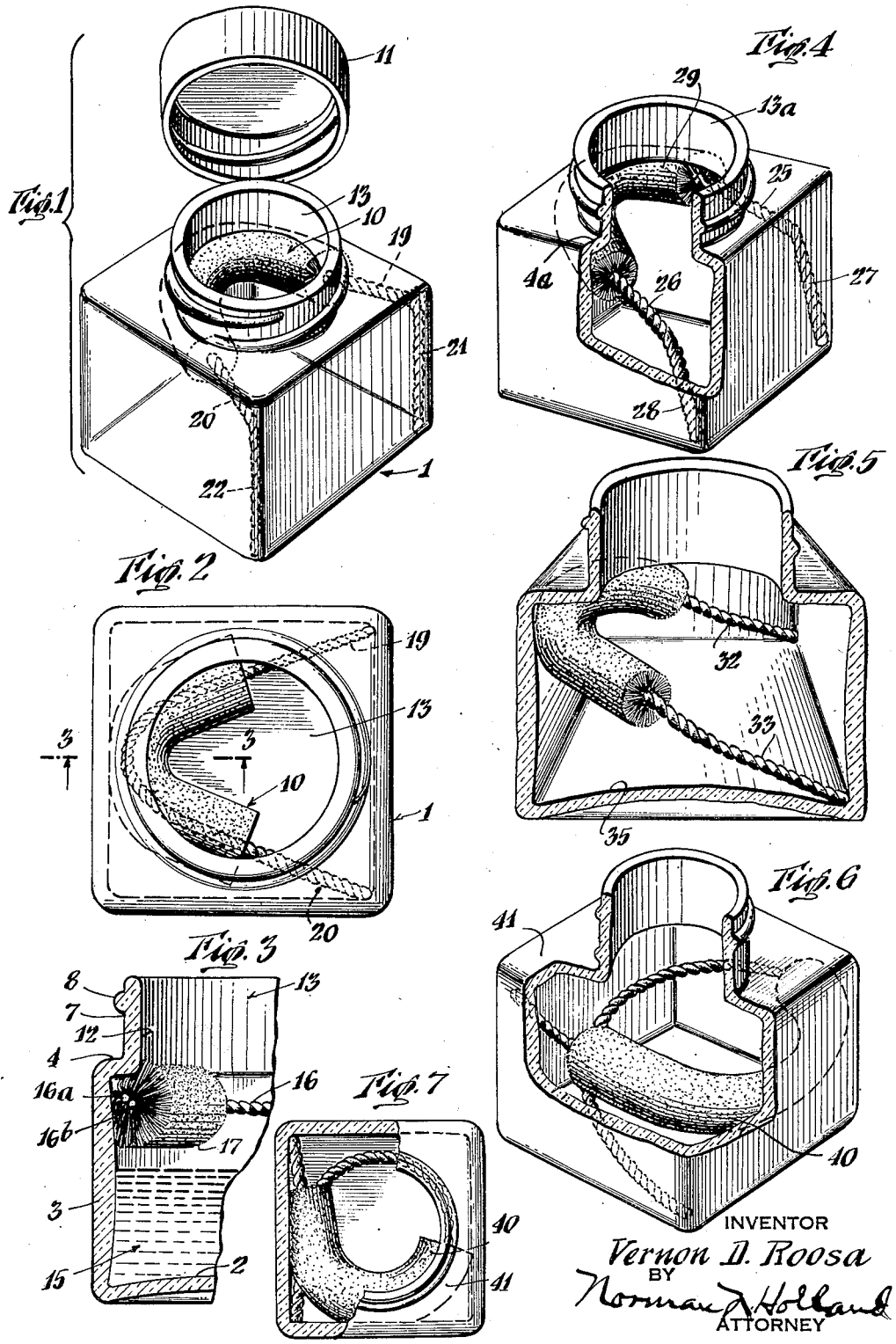
INVENTOR
Vernon D. Roosa
BY
Norman J. Holland
ATTORNEY

United States Patent Office 2,703,422
Patented Mar. 8, 1955

2,703,422

MANICURING DEVICE OR THE LIKE

Vernon D. Roosa, West Hartford, Conn.

Application September 29, 1950, Serial No. 187,461

6 Claims. (Cl. 15—140.2)

The present invention relates to manicuring devices for removing coatings from fingernails, and is of the general type disclosed in United States Patent No. 2,524,681, granted to me October 3, 1950.

As brought out in my above identified patent, fingernail coatings or "polishes" of various kinds are widely used by women. Such coatings usually comprise a liquid lacquer-like material, which forms a solid coating over the outer surface of the fingernails when dry. Removal of such a coating by applying some suitable liquid coating solvent with a dab of cloth, cotton, etc. is a messy operation, as frequently the liquid coating solvent and some of the dissolved coating are spilled or splattered onto nearby clothing, rugs or furniture. The invention set forth in my previous patent successfully overcomes or minimized such objections. The present invention is an improvemnt upon the invention of that previous patent and attains certain additional objectives which will be hereinafter brought out.

An object of the present invention is to provide an improved manicuring device for removing coatings from fingernails.

Another object of the invention is to provide an improved manicuring device for use in removing coatings from fingernails, which may be more readily manufactured.

Another object of the invention is to provide an improved manicuring device for removing coatings from fingernails wherein the parts may be more firmly retained in definite position with respect to each other.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view showing a preferred embodiment of the present invention;

Fig. 2 is a top plan view of the device shown in Fig. 1;

Fig. 3 is a fragmentary sectional view taken along line 3—3 of Fig. 2;

Fig. 4 is a perspective view, partly broken away, showing a slightly modified form of the invention;

Fig. 5 is a perspective view, partly broken away, showing another embodiment of the invention;

Fig. 6 is a perspective view, partly broken away, showing still another form of the invention; and Fig. 7 is a top plan view, partly broken away, showing the device of Fig. 6.

Referring more particularly to Figs. 1–3 of the drawings, there is shown a container 1 having therein a cleaning means 10 and a liquid coating solvent 15. The container 1 may be, for example, a glass bottle having a bottom wall 2, side walls 3 extending upwardly from the bottom, a shoulder 4 with a generally horizontal undersurface extending inwardly from the side walls and merging with a lower portion of an upwardly projecting mouth 7. The mouth 7 is provided about its exterior with some suitable means, for example, a screw thread 8, for cooperating with complementary means of a closure cap 11, to retain the latter on the container and prevent unwanted escape of the liquid coating solvent 15 from the container.

The inner surface 12 of the mouth is shown extending substantially vertically and perpendicular to the bottom wall 2; it will usually be circular and has a diameter such as to readily permit insertion and withdrawal of a person's finger through the mouth opening 13.

The container 1 is preferably non-circular, for example, square, rectangular or triangular, each of its plurality of sides being generally flat. Square or rectangular containers are frequently preferred due to the fact that they facilitate packing together of several of the containers for shipment. However, various features of the invention may be utilized with containers having circular side walls, as will be clear from the hereinafter description.

While any suitable dimensions may be used for the container 1, they are preferably such as to provide a short or squatty container which does not easily tip over when in use. A container having a bottom dimension about two inches along each edge, side walls about one and one-half inches in height, and a mouth opening of about one and one-quarter inches diameter has given satisfactory results in actual usage.

The cleaning means 10 is shown comprising a core 16 carrying laterally projecting yieldable means 17 located beneath and adjacent the mouth 7 and projecting inwardly beneath the mouth opening 13 to a position for ready contact with a fingernail on a finger inserted through the mouth opening 13. The core 16 may comprise a plurality of twisted together wires 16a and 16b and the scrubbing means or yieldable means 17 may comprise bristles secured between the wires. The cleaning means thus provided is sufficiently resilient for deformation during insertion into the container but is sufficiently stiff or rigid to maintain its position in the container during shipment and usage.

The upper portion of the cleaning means 10 illustrated in Figs. 1–3 has a pair of leg portions (19, 20) connected with each other to form a loop, for example a sort of U shape, with the leg portions extending generally along under portions of the container shoulder 4. Additional leg portions (21, 22) may extend downwardly from the upper leg portions 19, 20, along corners formed by the junction of adjacent container side walls. Lower ends of the upright legs (20, 21) engage with the container bottom wall 2. The scrubbing means 17 carried by the upper leg portions preferably has an inwardly facing surface adapted to receive a finger in the opening or hollow thus formed, so that the yieldable scrubbing portion may readily reach all portions of a fingernail placed into the opening and rub it.

The cleaning means is preferably sufficiently resilient to urge the legs 19, 20 and the downwardly extending legs 21, 22 apart from each other and into contact with portions of adjacent oppositely spaced side walls of the container. When the cleaning means 10 is positioned in the container, a connecting portion intermediate the upper leg portions 19 and 20 preferably engages with one side wall and the spaced leg portions preferably engage firmly with a different side wall so as to hold the cleaning member in desired position. The upright leg portions 21 and 22 tend to hold the ends of the upper leg portions 19, 20 up adjacent the undersurface of the container shoulder or ledge 4. In some instances the support legs or leg 21, 22 may be omitted and the reversely bent or loop portion retained in position due to a firm abutment of its closed end against one upper side wall portion and a firm abutment of the ends of the spaced legs 19, 20 against an opposite upper side wall portion. The cleaning means may be wetted with liquid coating solvent by tilting or shaking the container. When a fingernail is wetted with liquid coating solvent and rubbed against the scrubbing portion of the cleaning means, the nail coating is simultaneously dissolved and wiped off the fingernail.

To assemble the cleaning means with the container, the leg portions, 19, 21 and 20, 22 may be pressed toward each other until they may be inserted through the container mouth opening 13; the lower ends of the upright leg portions 21 and 22 are then inserted through the mouth opening and pushed down toward the bottom 2 and toward a sidewall. As the leg portions enter the container below the lower part of the mouth 7, they tend to spread apart. When the closed end or connecting portion of the cleaning means, intermediate the leg portions 19 and 20, is over the mouth opening 13, it may be pushed downwardly through the mouth opening. When this connecting portion is below the undersurface of ledge 4. it will move or snap outwardly beneath the ledge and toward a side wall which is opposite to that adiacent the upright leg portions 21 and 22. In assembled relationship the cleaning means is securely retained against lateral movement in the container as well as against vertical movement out through the mouth opening.

The upper leg portions 19 and 20 are not limited to the exact angle or spacing illustrated in Figs. 1–3, as any other suitable angle or spacing of these leg portions from each other may be used. The general arrangement illustrated has the advantage of providing a mouth opening 13, which is largely unobstructed and which gives ready insertion and withdrawal of a finger through the mouth opening.

In the relationship illustrated in Figs. 1–3 lowermost portions of the legs of 21 and 22 terminate at junctions between the bottom wall 2 and a side wall, and leg portions extend upwardly generally along junctions between adjacent side walls. These junctions between the bottom and side walls and between adjacent side walls act as seats or sockets for receiving portions of the cleaning means.

The form of the invention shown in Fig. 4 differs from that of Figs. 1–3 in that it uses a cleaning means with upper leg portions 25 and 26 inclined downwardly and merging with lower leg portions 27 and 28 that are inclined away from the vertical and from an adjacent side wall. Lower portions of the supporting legs 27 and 28 engage with the container inner surface adjacent locations where bottom and side walls merge with each other but the supporting legs 27 and 28 do not lie along a corner formed by two adjacent side walls, as in the form of Figs. 1–3. Assembly of the Fig. 4 cleaning means with a container, as well as its operation when assembled with the container, may be generally similar to that described in connection with Figs. 1–3.

The form of the invention illustrated in Fig. 5 differs from that illustrated and described in connection with Figs. 1–4 in that lower leg portions 32 and 33 lie closer to the container bottom 35. In some instances the form of cleaning means shown in Fig. 5 may be deemed desirable as tending to give a greater upwardly directed component of force to push the upper part thereof against the under surface of the container ledge.

In Figs. 6 and 7 there is shown a further form of the invention, which differs from those previously described in that it has a cleaning means arranged in generally helical shape. One portion at the lower end of the cleaning means is shown resting against a bottom and side wall of the container and the other rests against the underside of the container shoulder 41 and against an adjacent side wall. An intermediate portion of the cleaning means 40 is formed into a loop and carries a scrubbing means for retaining liquid coating solvent and rubbing against a fingernail. A portion of the scrubbing means is preferably located closely adjacent the under surface of shoulder 41 and the lower portion of the container mouth, and the scrubbing means projects inwardly so that a fingernail on an inserted finger may readily contact and move along the scrubbing means. Any suitable number of loops or turns may be used for the cleaning means 40.

A cleaning means 40 of Figs. 6 and 7 may be inserted into the container in various ways, for example, by twisting the free end portions around the central axis so as to decrease the diameter of the loop or spiral sufficiently to permit ready insertion through the mouth opening of the contianer. In this "compressed" condition the cleaning means may be inserted through the mouth opening; when it is below the container shoulder it may be released to automatically spread out under the shoulder, with the free end portions in contact with container wall portions.

It will be seen that the present invention provides an improved device adapted for use in removing coating from fingernails. The cleaning means and container may be easily assembled with each other, the scrubbing portion of the cleaning means is securely held in position adjacent the lower part of the container mouth opening, where it may be readily contacted by a fingernail on a finger inserted through the opening. The cleaning means is firmly mounted into position against movement with respect to the container.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device for use in removing coating from fingernails comprising a container having a bottom wall, a plurality of side walls angularly disposed with respect to each other, and a mouth, and elongated cleaning means mounted within said container having a supporting portion resting against and extending upwardly from the junction of said bottom wall and a pair of said side walls and having another portion extending generally laterally from said supporting portion at a location spaced above said bottom wall and carrying yieldable scrubbing means with a face disposed toward a portion of an opening through said mouth.

2. A device for use in removing coating from fingernails comprising a container having a bottom wall, a plurality of side walls angularly disposed with respect to each other, a mouth, and a shoulder inside the container adjacent the lower part of said mouth, and elongated cleaning means within said container having a loop portion beneath and extending generally lengthwise of a portion of said shoulder and carrying yieldable scrubbing means facing toward an opening through said mouth, said cleaning means having a leg portion extending from the loop portion and in engagement with the junction of one of a pair of said side walls and said bottom wall.

3. A device for use in removing coating from fingernails comprising a container having a bottom, a plurality of side walls angularly disposed with respect to each other, a mouth, and a shoulder connecting the lower portion of said mouth with each of said side walls, and elongated unitary cleaning means within the container having an upper portion beneath said shoulder and in engagement with an upper portion of one of said side walls and having a lower portion extending downwardly into engagement with a lower portion of another of said side walls, said upper portion of the cleaning means having a yieldable scrubbing portion extending along a portion of an opening through said mouth.

4. A device for use in removing coating from fingernails comprising a container having a bottom, a side wall, and a mouth, and yieldable elongated cleaning means mounted within said container having a reverse bend disposed generally crosswise of the container and a plurality of legs with end portions spaced from each other, said cleaning means being in engagement with a side wall portion adjacent said reverse bend and having portions of said legs in engagement with a generally opposite side wall portion.

5. A device for use in removing coating from fingernails comprising a container having a bottom, a side wall, and a mouth, and elongated cleaning means mounted within said container including a portion with a reverse bend having a part of its closed end in engagement with a side wall portion of the container and having spaced leg portions located adjacent oppositely disposed sides of an opening through said mouth, spaced ends of said leg portions being located adjacent a side wall portion which is opposite that engaged by said closed end, and a projection extending downwardly generally vertically from each of said spaced ends and in engagement with the bottom of the container.

6. A device as claimed in claim 1, in which said laterally extending portion includes a part in the general shape of a helical convolution.

References Cited in the file of this patent

UNITED STATES PATENTS

| | | |
|---|---|---|
| 232,906 | Sabin | Oct. 5, 1880 |
| 1,587,068 | Dinehart | June 1, 1926 |
| 2,273,495 | Nelson | Feb. 17, 1942 |
| 2,524,681 | Roosa | Oct. 3, 1950 |